United States Patent [19]

Bishop

[11] Patent Number: 5,657,699
[45] Date of Patent: Aug. 19, 1997

[54] RAIL GRIPPING VEHICLE

[76] Inventor: Arthur Ernest Bishop, 21 Seaman Street, Greenwich NSW 2065, Australia

[21] Appl. No.: 537,792
[22] PCT Filed: Apr. 19, 1994
[86] PCT No.: PCT/AU94/00201
    § 371 Date: Jan. 18, 1996
    § 102(e) Date: Jan. 18, 1996
[87] PCT Pub. No.: WO94/23980
    PCT Pub. Date: Oct. 27, 1994

[30]  Foreign Application Priority Data

Apr. 21, 1993  [AU]  Australia ................. PL8394

[51] Int. Cl.⁶ ................................................. B61C 11/00
[52] U.S. Cl. ........................... 105/30; 105/73; 105/76; 105/153
[58] Field of Search ....................... 105/30, 73, 75, 105/76, 153; 104/242, 243, 244, 245

[56]  References Cited

U.S. PATENT DOCUMENTS

| | | | |
|---|---|---|---|
| 2,018,087 | 10/1935 | Plass | 105/153 |
| 2,886,869 | 6/1959 | Tantlinger | 105/73 |
| 3,675,583 | 7/1972 | Sobey et al. | 105/30 |
| 4,023,503 | 5/1977 | Grop | 105/30 |
| 4,044,688 | 8/1977 | Kita | 105/30 |
| 4,794,865 | 1/1989 | Lindberg | 105/30 |
| 5,092,249 | 3/1992 | Knuettel | 105/30 |
| 5,381,737 | 1/1995 | Trenary | 105/30 |

FOREIGN PATENT DOCUMENTS

| | | |
|---|---|---|
| 70109/87 | 9/1988 | Australia . |
| 0132934 | 2/1985 | European Pat. Off. . |
| 0488475 | 6/1992 | European Pat. Off. . |
| 0520591 | 12/1992 | European Pat. Off. . |
| 0582348 | 2/1994 | European Pat. Off. . |
| 650162 | 10/1935 | Germany . |
| 2001921 | 2/1979 | United Kingdom . |
| 94/18048 | 8/1994 | WIPO . |

OTHER PUBLICATIONS

Australian Railways, vol. 2, No. 1, Feb./Mar., 1988.
Weinberger, H.; "The German M–Bahn System"; The Journal of Advanced Transportation, vol. 19:1, pp. 73–84, 1985.
Anderson, J. Edward; "The Taxi 2000 Personal Rapid Transit System", The Journal of Advanced Transportation vol. 22, Spring 1988.

Primary Examiner—S. Joseph Morano
Attorney, Agent, or Firm—Spencer & Frank

[57]  ABSTRACT

A combination including a track arrangement and a vehicle to be operated on the track arrangement. The track arrangement has two sets of laterally spaced apart running faces, each set including an upper running face and a lower running face. The vehicle includes a plurality of steerable axle assemblies, each axle assembly having an axle arrangement, a pair of upper wheels journalled on the axle arrangement and engageable with respective upper running faces; and a pair of lower wheels journalled on the axle arrangement and engageable with respective lower running faces. A steering arrangement urges the axle assemblies to align with the track arrangement. A loss sensing arrangement which senses a loss of adhesion or an imminent loss of adhesion of the upper wheels with respect to the respective upper running faces. A signal arrangement generates a signal indicative of one of the loss of adhesion and the imminent loss of adhesion of the upper wheels with respect to the respective upper running faces. An actuating mechanism forces the second set of wheels into running engagement with the respective lower running faces in response to the signal from the signal arrangement and with a force of engagement dependent on the signal from the signal arrangement.

11 Claims, 6 Drawing Sheets

RAIL GRIPPING VEHICLE

FIELD OF THE INVENTION

The present invention is related to a rail or track guided vehicle system. Whilst the invention is according to one embodiment directed towards and primarily described with reference to automated guideway rapid transit systems, it is considered that the invention is suitable for use with other forms of rail or track guided vehicle systems used for transporting passengers or freight or for use in materials handling systems.

BACKGROUND OF THE INVENTION

An automated guideway system utilising vehicles which each accommodate, for example, between eight and twenty four passengers would typically operate on guideways separated from other vehicular traffic and pedestrians. Due to economic considerations, the installation of automated guideway transit systems in the suburbs or central business districts of cities will necessitate that the guideway track be elevated above street level rather than underground and will generally be carried on a structure comprising concrete or steel beams supported on pillars. Such guideway tracks must be capable of sharp turns at city intersections in order to reduce the cost of building resumptions.

In order to be acceptable in the abovementioned environment, the guideways should be of least width in order to minimise the visual impact and shade, and the system must also operate with low noise and vibration levels. In order for such systems to be easily accessible to users, the elevated guideways should be able to descend and ascend on ramps, so that vehicles can be accessed from street level when necessary. In addition, the vehicles must also have adequate acceleration and braking capability, and be capable of very short emergency stopping distances needed if they are to operate at high speeds and at close intervals.

Typically, in prior art rapid transit systems such as the TNT Harbourlink operating at Darling Harbour, Sydney which operates on the Von Roll system and detailed in Australian Railways, Volume 2, No 1, February/March, 1988, the vehicles are equipped with rubber tire pneumatic main drive wheels with solid rubber tire wheels engaging the side faces of the guideway beam (or track) for directional control. Additional solid wheels are provided clear of the underside of the upper flange of the beam as a safeguard against overturning. The main wheels are generally pneumatic, which due to their compliance, provide poor lateral and rolling support when operating on a narrow guideway and therefore preclude operation at high speed. If rigid wheels are used, made from steel for example, the stability problems of the abovementioned pneumatic tire vehicles can be overcome. Flanges can also be used on such steel wheels to provide lateral constraint to the vehicle on the guideway.

However, some problems exist with utilising vehicles with either rigid or pneumatic tire driven wheels which are detrimental to the operation of known prior art transit systems. One problem is that such vehicles are prone to slippage during braking, acceleration or grade climbing, particularly in wet or icy conditions. This problem is even more serious when considering the operation of vehicles on an automated guideway system as such an operation is insensitive to weather conditions. Another problem associated with driven rigid wheels, and in particular with steel wheels, is that they tend to be noisy, particularly if provided with a flange that comes in contact with the side of the guideways in turns.

Prior art automated rapid transit systems which do not suffer from slippage problems during wet or icy conditions are The M-Bahn System, detailed in the paper entitled The German M-Bahn System by H. Weinberger in The Journal of Advanced Transportation, Vol. 19:1, pages 73–84, 1985 and in the paper entitled The Taxi 2000 Personal Rapid Transit System by J. Edward Anderson, in the Journal of Advanced Transportation, Vol. 22, Spring 1988. However, these systems operate using electromagnetic linear induction motors for propulsion rather than conventional electric motor drive to the wheels. Whilst such systems overcome some of the earlier mentioned slippage problems, during acceleration or grade climbing, they inevitably lack emergency braking capability needed to achieve close spacing of vehicles when travelling at higher speeds. Moreover, they are costly and less efficient than direct drive systems. The leakage of electromagnetic flux from such linear motors is also a problem. Such systems may not be suited to use when the guidance track incorporates sharp horizontal or vertical curves, due to the close clearance required between the active member of the linear motor suspended on the vehicle and the motor plate supported on the guideway.

SUMMARY OF THE INVENTION

It is an object of the present invention to provide a track guided vehicle system having driven or non-driven wheels which substantially overcomes the problem of slippage whether during grade climbing, braking or emergency stopping.

The present invention can be utilised in conjunction with the self steering bogie as disclosed in our published International Patent application No PCT/AU94/00045.

One aspect of the present invention pertains to a track means and a vehicle to operate thereon, the track means comprising two spaced apart sets of running faces each of which has an upper running face and a lower running face, the vehicle having at least one axle assembly with at least a first set of two wheels journalled thereon and engaged with said respective upper running faces and a second set of two wheels journalled thereon and adapted to engage with the respective lower running faces, means to sense loss of adhesion or imminent loss of adhesion of the first set of wheels with respect to the upper running faces, means to generate a signal indicative of said loss of adhesion and at least one actuating mechanism acting in response to such a signal to force said second set of wheels into running engagement with the respective lower running faces the force of engagement being dependent on said signal.

Preferably, the actuating mechanism is adapted for movement of the second set of wheels between an engaged position and an unengaged position where the second set of wheels are not in contact with the lower running faces.

Preferably, the sensed signal indicating loss of adhesion or imminent loss of adhesion of the first set of wheels is a measure of one or more of track means incline, track condition, loading of the vehicle or brake pressure or torque applied to the first set of wheels.

Preferably the track means comprises two spaced apart rails each having one of the sets of running faces.

A second aspect the invention pertains to a track means and a vehicle to operate thereon, the track means comprising laterally spaced apart sets of running faces each of which has an upper running face and a lower running face, the vehicle having at least one self steering bogie symmetrical about a centerline plane and having a principal axle assembly including a flanged set of principal wheels whose axes are inclined to each other and to the centerline plane and engaged with said upper running faces, a pair of freely rotating steering wheels also having axes inclined to each other and the centreline plane and engaged with said upper running faces, said steering wheels being supported from the principal axle assembly by a support structure about an axis lying on the centreline plane and inclined to the horizontal such that the steering wheels are longitudinally spaced apart from the principal wheels, and a pair of grip wheels supported from the principal assembly and engaged with said respective lower running faces, means to sense loss of adhesion or imminent loss of adhesion of the first set of wheels with respect to the upper running faces, means to generate a signal indicative of said loss of adhesion and at least one actuating mechanism acting in response to such a signal to force said second set of wheels into running engagement with the respective lower running faces, the force of engagement being dependent on said signal.

BRIEF DESCRIPTION OF THE DRAWINGS

The invention will now be described by non-limiting examples with reference to the following drawings.

DETAILED DESCRIPTION OF THE INVENTION

Figure 1:
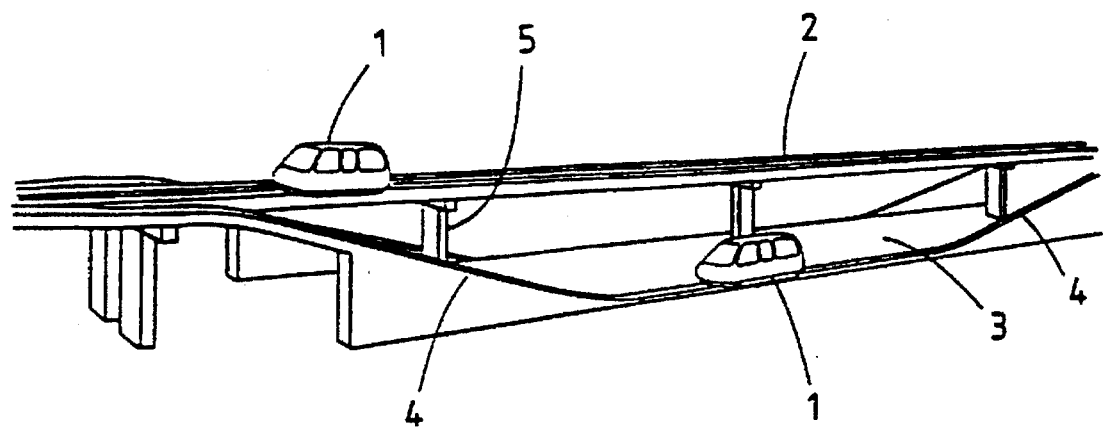
FIG. 1 depicts a perspective view of a portion of a guideway system showing a boarding station and vehicles travelling thereon.
Figure 2:
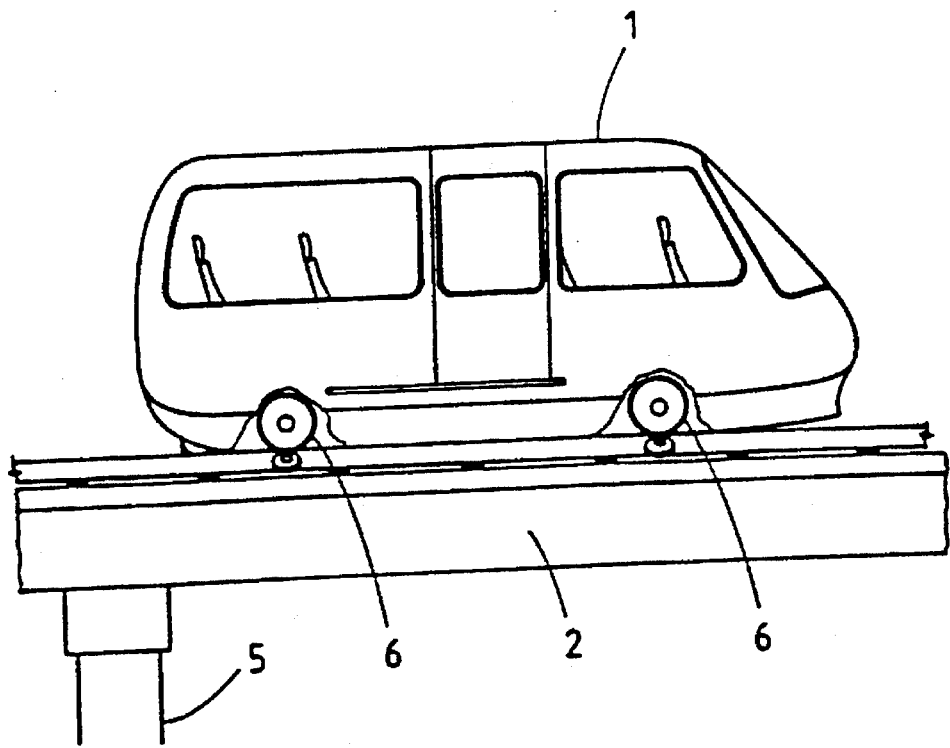
FIG. 2 is a side elevational view of one embodiment of a vehicle travelling on the guideway system in accordance with the present invention.
Figure 3:
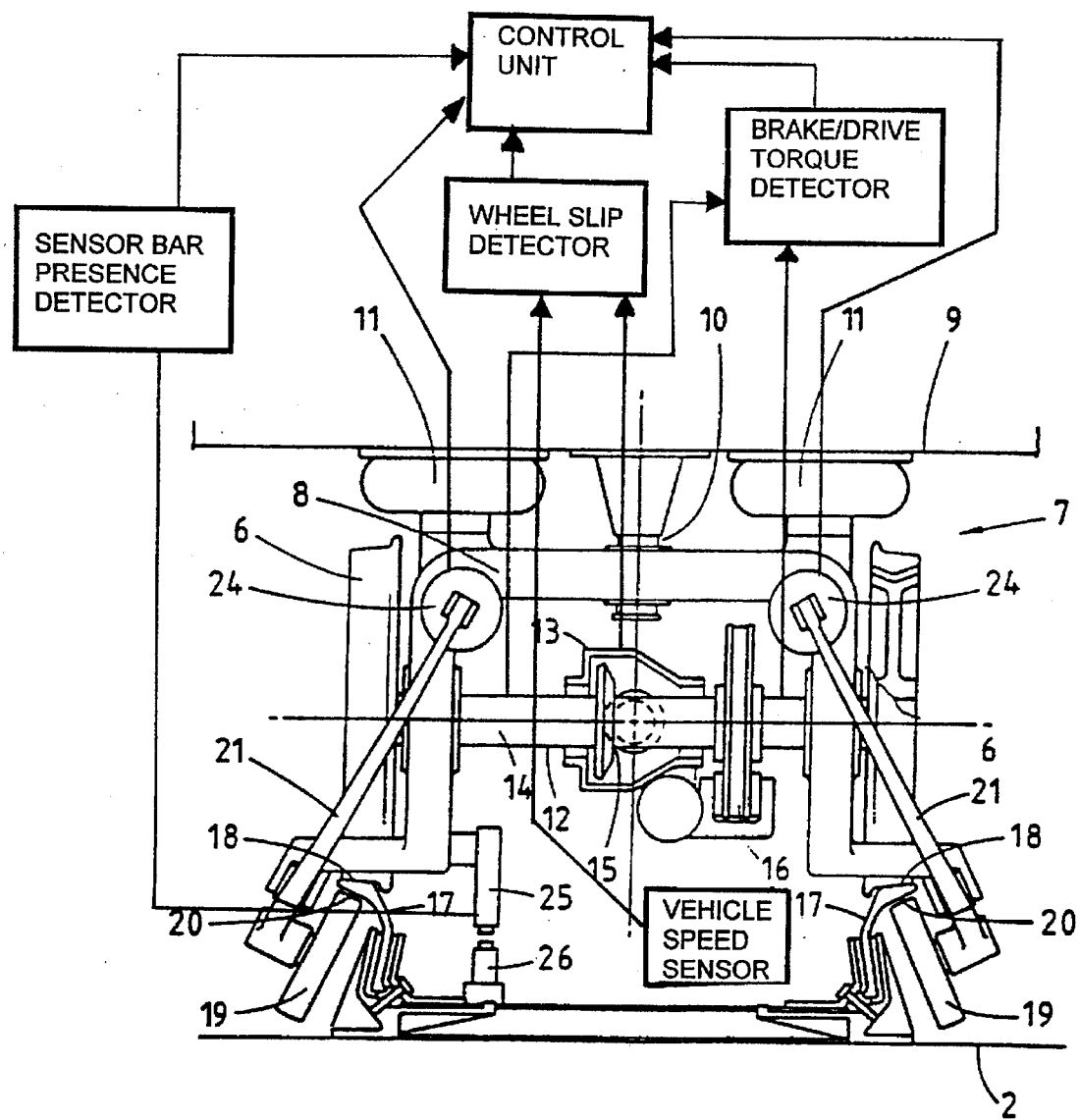
FIG. 3 is a cross sectional view through one wheel set of a bogie of the vehicle depicted in FIG. 2.

In a first embodiment FIGS. 1 and 2 depict vehicles 1 traversing a segment of an elevated guideway 2 which includes a station or boarding area 3 having ramps 4 at each end steeply inclined to reduce to a minimum the space occupied by the station. Guideway 2 is supported by pillars 5. Vehicle 1 has wheels 5 mounted on two bogies 7, one of which is depicted in FIG. 3. Bogies 7 are preferably identical and pivoted to vehicle 1 to allow sharp turns to be negotiated. One or both bogies 7 are provided with collector brushes (not shown) which contact longitudinal conductors associated with the guideway 2 in a usual manner to provide power.

Referring to FIG. 3, bogie 7 has a substantially saddle shaped support member 8 which is pivotally connected to the underside of floor structure 9 of vehicle 1 by means of pivot joint 10. Two air springs 11 also connect support member 8 to floor structure 9 on opposite sides of pivot joint 10 in order to allow limited movement therebetween and to allow for roll and adjustment of ride height.

A principal axle assembly 12 mounted on support member 8 comprises a housing 13 which contains a drive gear mechanism 15 for driving axle shaft 14 which has drive wheels 6 at each end thereof. The drive gear mechanism 15 being driven by an electric motor (not shown). The axle shaft 14 is provided with a disc brake 16 for braking of drive wheels 6.

Drive wheels 6 run on two spaced apart rails 17 which are resiliently mounted to guideway 2. Drive wheels 6 engaging rails 17 on upper faces 18 of the respective rail heads. Bogie 7 is also equipped with two grip wheels 19 which are movably engagable with respective lower faces 20 of the heads of rails 17.

Figure 4:
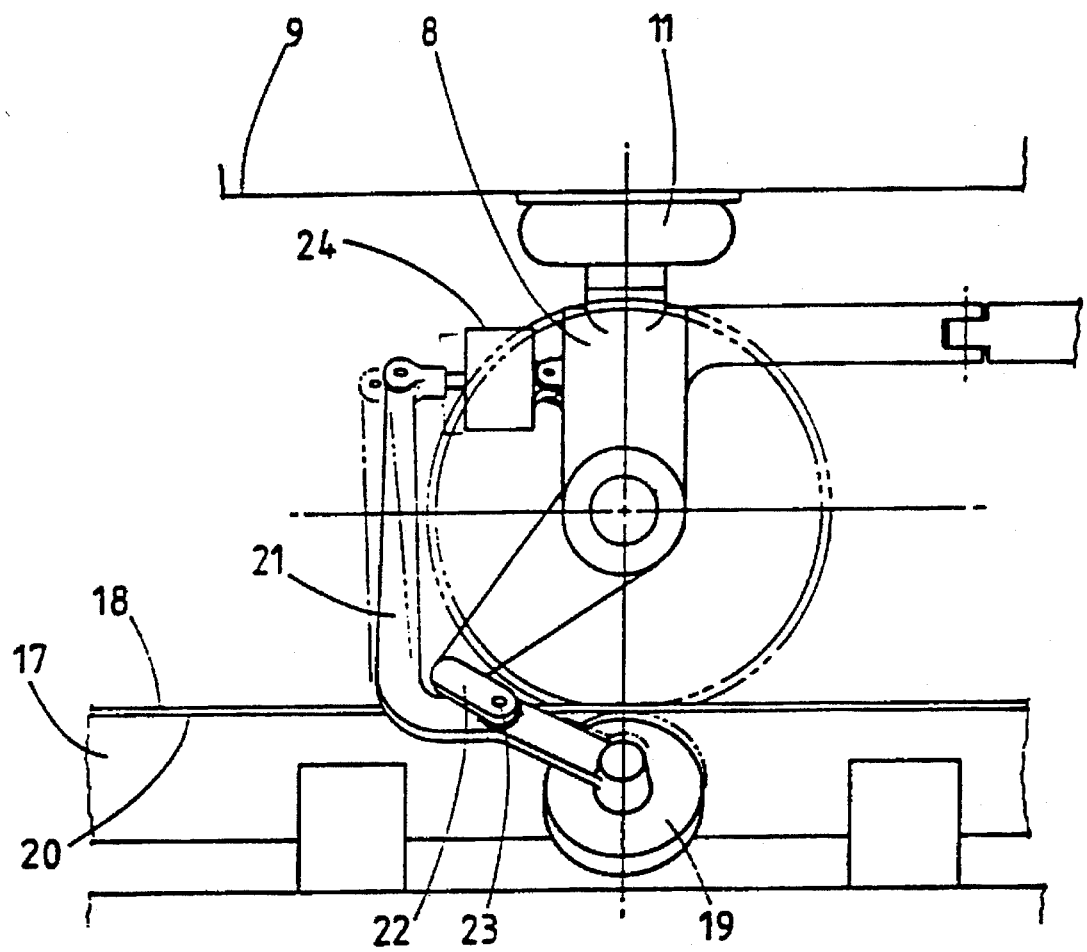
FIG. 4 is an enlarged side view of the wheel set depicted in FIG. 3 showing a grip wheel in accordance with the present invention.

Referring to FIG. 4, each grip wheel 19 is rotatably mounted to one end of an actuating lever 21 which is pivotally connected to projection 22 of support member 8 at pivot 23 and having its other free end pivotally connected to the piston rod of a pneumatic cylinder 24. Actuation of pneumatic cylinder 24 which is pivotally connected to support member 8 causes pivotal movement of the actuating lever 21 about pivot joint 23, thereby causing engagement and disengagement of the grip wheel 19 with the lower face 20 of rail 17. Also when grip wheel 19 is engaged with lower face 20 the force of engagement can be varied by varying the pressure in pneumatic cylinder 24.

During travel of vehicle 1 along the guideway 2, this arrangement allows for grip wheels 19 to be urged against lower faces 20 of rails 17 when drive wheels 6 are about to lose or have momentarily lost adhesion with upper faces 18.

In order to respond to the imminent loss or actual loss of adhesion of drive wheels 6 each vehicle 1 and guideway 2 are provided with various sensing means for controlling actuation of grip wheels 19. Preferably, pneumatic cylinders 24 would be connected to a control unit on each vehicle 1, which would continuously read and collate the parameters being sensed by the various sensing means and thereby variably control actuation of grip wheels 19 against lower faces 20 of rails 17.

For instance, sensing means could be provided for sensing the braking or torque being applied to drive wheels 6, and therefore allow grip wheels 19 to be variably urged against lower faces 20 of rails 17 during braking or propulsion of vehicle 1.

A further sensing means would preferably be employed to sense incline or grade on various sections of the track. Sensor bars 26, one of which is shown in FIG. 3, run parallel to rails 17 on segments of guideway 2 which are steeply inclined. A sensing unit 25 mounted on bogie 7 of each vehicle 1 is adapted to sense the presence of a sensor bar 26, and the control unit can therefore actuate grip wheels 19 to urge against lower faces 20 of rails 17 whilst the sensor bar 26 is being passed over. The sensor bars 26 would be present on guideway 2 wherever a steep incline is present, including ramps 4 at each end of the boarding area 3 (FIG. 1).

In order to sense slippage of wheels 6, a further sensing means could be employed which compares the vehicles speed with the rotation of wheels 6. By continuously comparing these parameters wheel slippage can be sensed and grip wheels 19 actuated as necessary. Furthermore the grip wheels 19 can be positioned clear of the lower faces 20 of rails 17, as shown in FIG. 3, under most operating conditions, and only engaged when conditions require additional adhesion thereby reducing wear on the mechanism and possible vibration or noise.

In a second embodiment the present invention is shown in FIGS. 5 to 9 in which a vehicle adapted for traversing elevated guideways incorporates a self-steering bogie as disclosed in my published International application PCT/AU94/00046.

Figure 5:
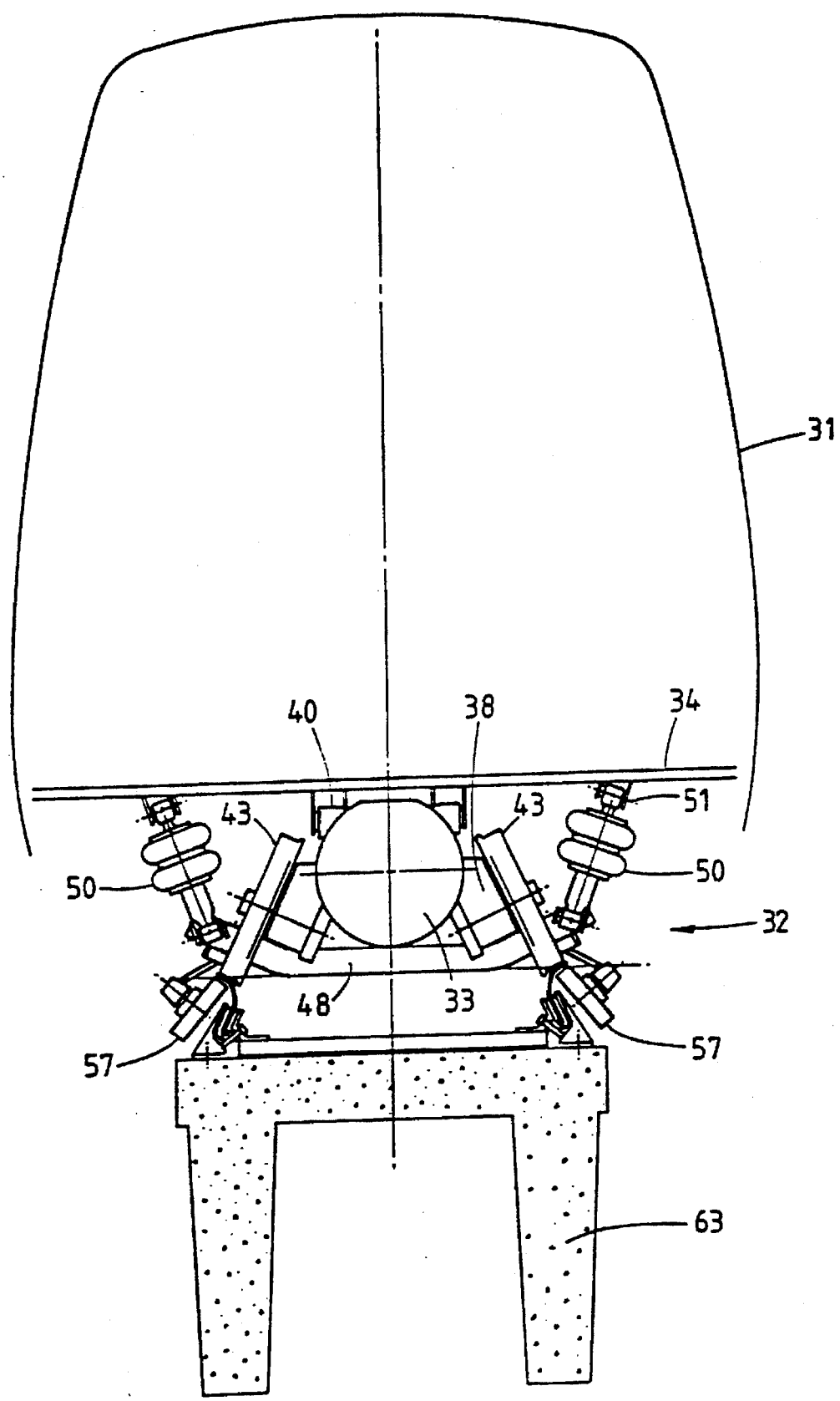
FIG. 5 is a front sectional view of a wheel set of a bogie for a vehicle in a second embodiment of the present invention.
Figure 6:
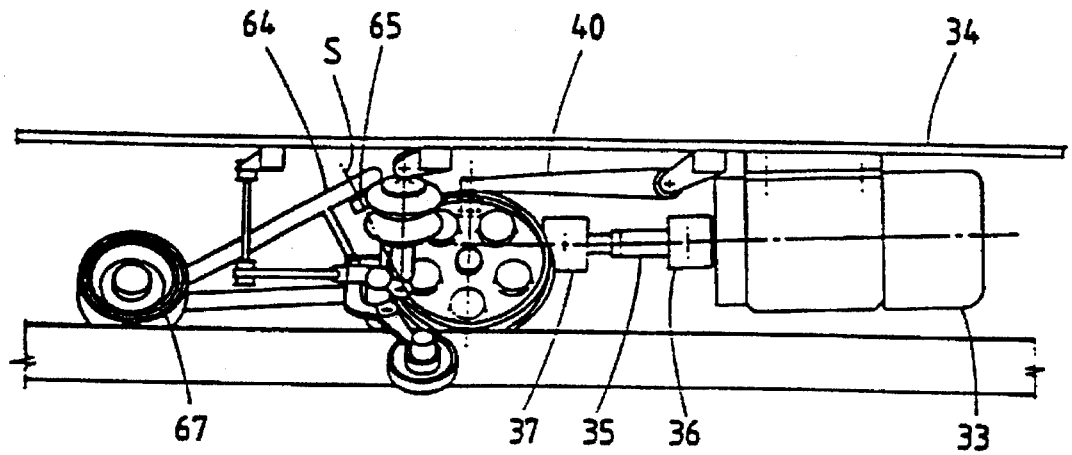
FIG. 6 is a side view of the bogie of the vehicle shown in FIG. 5.
Figure 7:
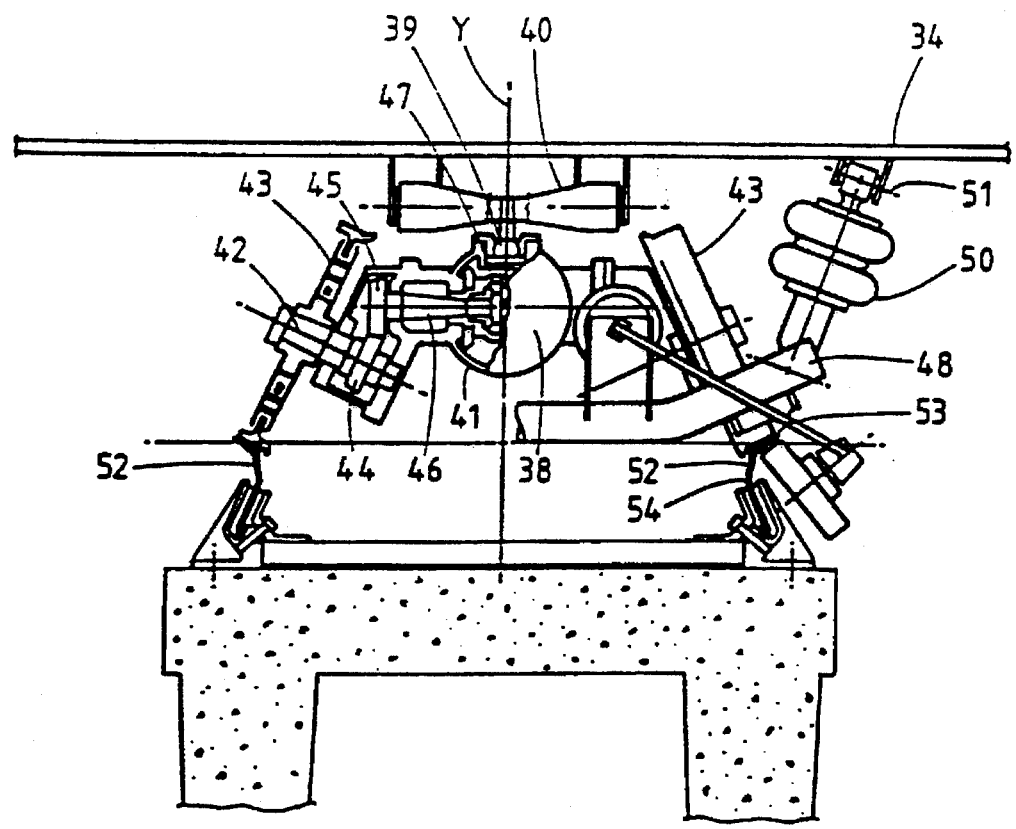
FIG. 7 is a partial cross sectional view though the drive wheel set of the bogie shown in FIG. 6.

Referring to FIGS. 5 to 7, a vehicle 31 according to the second embodiment has two preferably identical bogies 32, one of which is shown. Bogie 32 is driven by electric motor 33, mounted on the underside of floor structure 34 of vehicle 31 and drives through drive shaft 35 and universal joints 36 and 37 the differential gearing of principal axle assembly 38 in a manner to be described (FIG. 6).

Principal axle assembly 38 is pivoted by spherical joint 39 to suspension member 40 which is hinged to the underside of floor structure 34 about axis X. Thus bogie 32 is restrained from lateral movement with respect to the upper portion of the vehicle but can move vertically, pivot or roll with respect thereto.

Principal axle assembly 38, which is symmetrical about axis Y, comprises housing 41 which extends laterally to provide journals for shafts 42 on which are mounted flanged drive wheels 43. Shafts 42 incorporate bevel gear 44 driven by bevel gears 45 mounted on shaft 46 extending from each side of differential assembly 47. The shaft carrying universal joint 37 is journalled in housing 41 and carries the pinion of the well-known crown wheel and pinion arrangement as universally used in automotive vehicles.

Mounted on housing 41 by brackets (not shown) is tube 48 which extends beyond drive wheels 43 to provide swivel-mountings for the lower end of pneumatic support struts 50 which are also provided with swivel mountings 51 to the underside of floor structure 34. Pneumatic support struts 50 thus provide a means of carrying the vertical load of vehicle 31 to the wheels 43 whilst allowing the principal axle assembly 38 to swivel, move vertically and roll with respect to the upper portion of the vehicle.

Drive wheels 43 are here shown riding on rails 52 in a dihedaral fashion as described in my published International application No PCT/AU94/00046.

Figure 8:
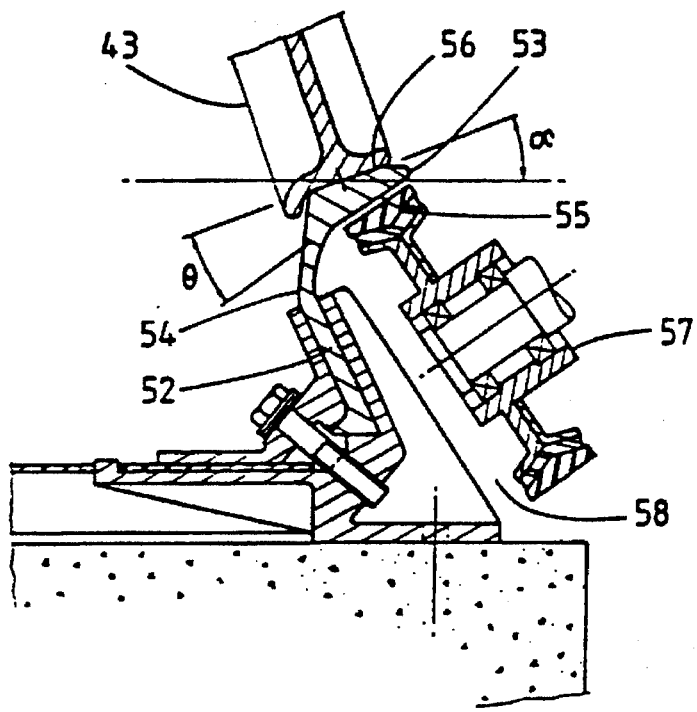
FIG. 8 is an enlarged cross sectional view of the wheel/ grip wheel and rail arrangement through the centreline of the grip wheel of FIG. 6.

Referring to the enlarged view in FIG. 8, it will be seen that the head 53 of rail 52 is laterally displaced with respect to web 54 and is inclined to the horizontal at about the same angle α as the rim of wheel 43. Web 54 is also inclined to better accept the direction of wheel load. The lower face 55 is not parallel to the upper face 56 but inclined thereto at an angle θ to provide working clearance for the face of grip wheel 57 which otherwise might strike the rail support in the region indicated by 58. Whilst two grip wheels are used in this embodiment, one on each rail 52, for ease of description, the operation of only one grip wheel 57 will be described.

Figure 9:
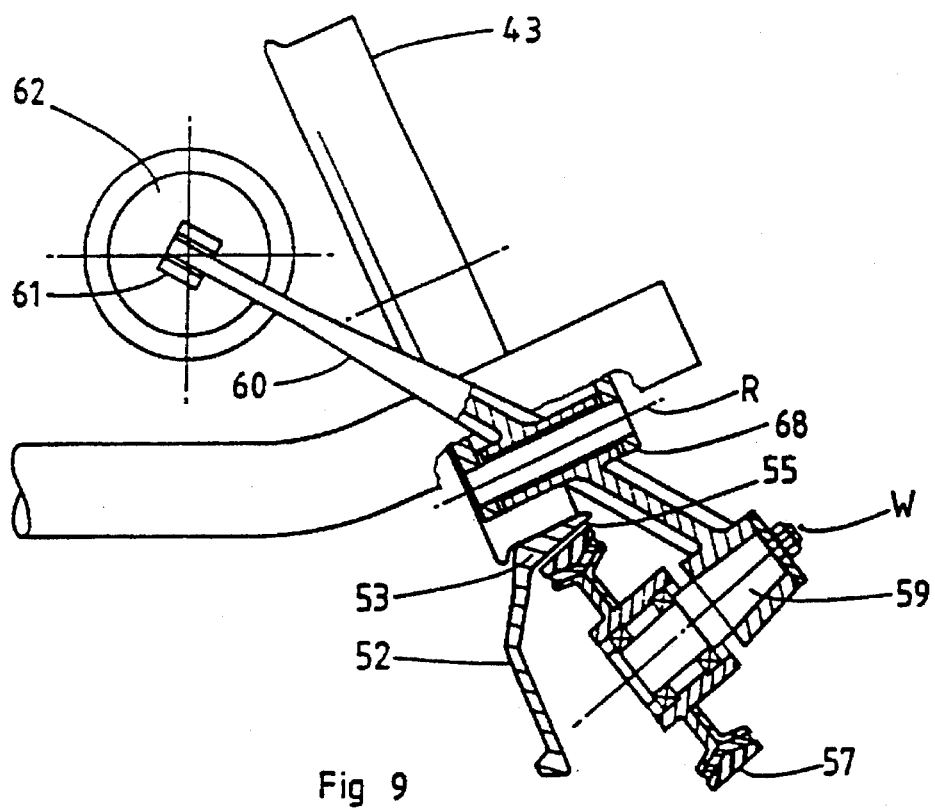
FIG. 9 is an enlarged partial cross sectional view of the grip wheel of FIG. 8 and its actuating mechanism.

Referring now to FIGS. 5 and 9, grip wheel 57 freely rotates on axis W of spindle 59 which itself is pivoted about axis R in a housing 68. Spindle 59 is mounted on the lower end of lever 60 which is pivotally connected by clevis 61 to pneumatic cylinder 62 so as to cause grip wheel 57 to be forced into contact with the lower face 55 of rail head 53 so increasing the vertical pressure between wheel 43 and rail 52.

Referring back to FIG. 5, which shows the front view of the vehicle 31 including of the electric drive motor 33 and principal axle assembly 38 together with a section through guideway support beam 63. It will be appreciated from this view that because of the width of the track, without the presence of grip wheels 57, the stability of the vehicle might be inadequate.

FIGS. 5 to 7 illustrate the provision to steer the principal axle assembly 38 in a manner similar to that described in my published International application No PCT/AU94/00046. A forked tubular structure 64, see FIG. 6 is supported by upper ball joint 65 and a lower ball joint (not shown). The ball joint studs comprise a spherical head having a tapered extension and threaded end as are well known in automotive suspension practice. The centers of spherical heads lie along pivot axis S, and the tapered extensions of the ball joint studs are firmly secured in lugs extending from housing 41. The ball sockets are contained within forked tubular structure 64 which extends rearwardly to support two axles which journal two freely rotating steering wheels 67, only one of which is shown in FIG. 5.

As previously mentioned, whilst this arrangement allows for self-steering characteristics mentioned, the grip wheels 57 are utilised to ensure adhesion of the drive wheels 43.

Referring to FIG. 6, it will be seen that pneumatic support struts 50 are positioned longitudinally somewhat behind the principal axle assembly 38 (or center of drive wheels 43) at a distance about ⅕th of the distance between the principal wheels and steering wheels 67. Thus the weight of the vehicle tends to keep the steering wheels 67 in sufficiently intimate contact with rails 52 so that they can perform their steering task. Because spherical ball joint 39 is located longitudinally in the same plane as the axes of drive wheels 43, side forces acting on the vehicle apply no unwanted steering forces to the principal axle assembly 38 so that the required steering forces are small.

The grip wheels 57 are located longitudinally near the same plane of pneumatic support struts 50, so that an increased vertical force resulting from the engagement of grip wheels 57 is applied to both drive wheels 43 and also to a lesser extent to steering wheels 67 when pneumatic cylinders 62 are actuated thus inhibiting any tendency of steering wheels 67 to be lifted from the rails 52 during braking.

The operation of pneumatic cylinders 62 are controlled by air valves connected to a compressed air storage tank and pump (not shown) on the vehicle 31. They may be operated at selected positions along the guideway where extra braking or adhesion is required to avoid slippage as detailed in the first embodiment, by using sensing means to determine loss or imminent loss of adhesion on the drive wheel 43.

Routine braking may be accomplished by regenerative braking of electric motor 33 or by using disc brakes (not shown) as in the first embodiment.

In both of the abovementioned embodiments the grip wheels are substantially made from steel and comprise a central steel hub with a steel outer lining mounted thereon with a synthetic resilient material, such as a polymer material, therebetween. However, in other not shown preferred embodiments the grip wheels may be made of a single suitable material or combination of suitable materials.

Further, whilst in both of the abovementioned embodiments the grip wheels are actuated by pneumatic cylinders pivotally linked to the grip wheels via actuating levers, it may be that in further not shown embodiments the actuation mechanism for the grip wheels comprises some other suitable actuating means, such as a hydraulic or electromechanical system.

In both of the abovementioned embodiments the grip wheels are used to ensure adhesion of drive wheels. However, in further not shown embodiments the grip wheels could be used to ensure the adhesion of non-drive wheels. For instance, the grip wheels could be used on vehicles which have non drive wheels and are propelled by linear induction systems.

The control units for controlling actuation of the grip wheels of the abovementioned embodiments and further not shown embodiments may be adapted to actuate grip wheels on a single vehicle simultaneously or individually. Further, the control unit may form part of a larger control unit which controls various parameters of the vehicle and may be adapted to transmit and receive signals from a larger control system which monitors the whole guideway system.

In further not shown embodiments, vehicles in accordance with the present invention could run on rails or tracks which have a different form from those described above. For instance, the track section may comprise a concrete slab with opposed embedded running members on either side of the slab providing upper and lower running faces which the wheels and grip wheels of the vehicle respectively engage. The term track means covers such different forms of track and rail sections.

In accordance with the present invention the use of grip wheels to ensure adhesion of wheels may be used to achieve increased speeds and braking effectiveness of vehicles as well as reduce the safe intervals between vehicles being run on the system.

The present invention is also suitable for use on material handling and other conveyance systems which utilise vehicles on guideway systems.

The embodiments of the invention as described above are given by way of example only as constituting preferred forms of the invention defined broadly in the various aspects.

It will be appreciated by persons skilled in the art that numerous variations and/or modifications may be made to the invention as shown in the specific embodiments without departing from the spirit or scope of the invention as broadly described.

The claims defining the invention are as follows:

1. A track means and a vehicle to operate thereon, the track means comprising two sets of running faces laterally spaced apart about a longitudinal axis each having an upper running face and a lower running face, the vehicle having a plurality of steerable axle assemblies, each said axle assembly having at least a first set of two wheels journalled thereon and engaged with said respective upper running faces and a second set of two wheels journalled thereon and adapted to engage with the respective lower running faces, steering means adapted to urge said axle assemblies to align with said track means to sense loss of adhesion or imminent loss of adhesion of the first set of wheels with respect to the upper running faces, means to generate a signal indicative of said loss of adhesion and at least one actuating mechanism acting in response to such a signal to force said second set of wheels into running engagement with the respective lower running faces the force of engagement being dependent on said signal, the actuating mechanism being adapted for movement of the second set of wheels between an engaged position with the respective lower running faces and an unengaged position where the second set of wheels are not in contact with the running faces.

2. A track means and a vehicle as claimed in claim 1, wherein the sensed signal indicating loss of adhesion or imminent loss of adhesion of the first set of wheels is a measure of one or more of track incline, track condition, loading of the vehicle or brake pressure or torque applied to the first set of wheels.

3. A track means and a vehicle as claimed in claim 1, wherein the track means comprises two spaced apart rails each having one of the sets of running faces.

4. A track means and a vehicle as claimed in claim 1, wherein the first set of two wheels are driven wheels.

5. A track means and a vehicle to operate thereon, the track means comprising two laterally spaced apart sets of running faces each of which having an upper running face and a lower running face, the vehicle having at least one self steering bogie symmetrical about a centerline plane having a principal axle assembly with opposed flanged principal wheels whose axes are inclined to each other and the centerline plane and engaged with said upper running faces, a pair of freely rotating steering wheels also having axes inclined to each other and the centerline plane and engaged with said upper running faces, said steering wheels being longitudinally spaced apart from the principal wheels and supported from the principal axle assembly by a support structure about an axis lying on the centerline plane and inclined to the horizontal such that the steering wheels are longitudinally spaced apart from the principal wheels, and a pair of grip wheels supported from the principal assembly and engageable with said respective lower running faces, means to sense loss of adhesion or imminent loss of adhesion of the principal wheels with respect to the upper running faces, means to generate a signal indicative of said loss of adhesion and at least one actuating mechanism acting in response to such a signal to force said grip wheels into running engagement with the respective lower running faces the force of engagement being dependent on said signal.

6. A combination comprising a track means and a vehicle adapted to be operated on the track means, wherein:
the track means has two sets of laterally spaced apart running faces, each set including an upper running face and a lower running face; and
the vehicle includes:
a plurality of steerable axle assemblies, each axle assembly having:
an axle arrangement;
a pair of upper wheels journalled on the axle arrangement and adapted to engage with respective upper running faces of the track means; and
a pair of lower wheels journalled on the axle arrangement and adapted to engage with respective lower running faces of the track means;
steering means operatively coupled to the axle assemblies for urging the axle assemblies to align with the track means;
loss sensing means which are at least one of operatively coupled to the axle assemblies and adapted to be operatively coupled to the track means for sensing at least one of a loss of adhesion and an imminent loss of adhesion of the upper wheels with respect to the respective upper running faces;
signal means operatively coupled to the loss sensing means for generating a signal indicative of one of the loss of adhesion and the imminent loss of adhesion of the upper wheels with respect to the respective upper running faces; and
an actuating mechanism operatively coupled to the signal means for forcing the second set of wheels into running engagement with the respective lower running faces in response to the signal from the signal means and with a force of engagement dependent on the signal from the signal means.

7. The combination according to claim 6, wherein the loss sensing means is adapted to measure at least one of a track incline, a track condition, a loading of the vehicle, a brake pressure and a torque applied to the pair of upper wheels as a measure of the at least one of the loss of adhesion and the imminent loss of adhesion of the upper wheels with respect to the upper running faces.

8. The combination according to claim 6, wherein the track means comprise a pair of laterally spaced apart rails, each rail including one of the sets of running faces.

9. The combination according to claim 6, wherein the upper wheels are driven wheels.

10. A combination including a track means and a vehicle adapted to be operated on the track means, wherein:

the track means has two sets of laterally spaced apart running faces, each set including an upper running face and a lower running face; and the vehicle includes a self-steering bogie symmetrical about a center longitudinal plane and including:

a pair of freely rotating steering wheels defining steering wheel axes inclined with respect to one another and with respect to the center longitudinal plane, the steering wheels further being adapted to engage with respective upper running faces of the track means;

a principal axle assembly having:

a principal axle arrangement;

a pair of flanged principal wheels supported at opposite sides of the principal axle arrangement and longitudinally spaced apart with respect to the steering wheels, the principal wheels defining principal wheel axes inclined with respect to one another and with respect to the center longitudinal plane and further being adapted to engage with the respective upper running faces of the track means;

a pair of grip wheels supported on the principal axle arrangement and adapted to engage with respective lower running faces of the track means;

a support structure having an axis lying on the center longitudinal plane and supporting the steering wheels on the principal axle assembly such that the steering wheels are inclined with respect to a horizontal direction;

loss sensing means which are at least one of operatively coupled to the principal axle assembly and adapted to be operatively coupled to the track means for sensing at least one of a loss of adhesion and an imminent loss of adhesion of the principal wheels with respect to the respective upper running faces;

signal means operatively coupled to the loss sensing means for generating a signal indicative of one of the loss of adhesion and the imminent loss of adhesion of the principal wheels with respect to the respective upper running faces; and an actuating mechanism operatively coupled to the signal means for forcing the grip wheels into running engagement with the respective lower running faces in response to the signal from the signal means and with a force of engagement dependent on the signal from the signal means.

11. The combination according to claim 10, wherein:

the grip wheels are longitudinally spaced apart from and disposed between the principal wheels and the steering wheels nearer to the principal wheels; and the actuating mechanism is adapted to force the grip wheels into running engagement with the respective lower running faces in response to the signal from the signal means and with a force of engagement dependent on the signal from the signal means such that both the principal wheels and the steering wheels are forced into engagement with the upper running faces.

* * * * *